United States Patent [19]

Moore et al.

[11] Patent Number: 4,544,139

[45] Date of Patent: Oct. 1, 1985

[54] COATED EXOTHERMIC CUTTING ELECTRODE

[75] Inventors: Paul E. Moore, Glouster; Robert L. Strohl; Lawrence R. Soisson, both of Lancaster, all of Ohio

[73] Assignee: Arcair Company, Lancaster, Ohio

[21] Appl. No.: 662,207

[22] Filed: Oct. 18, 1984

[51] Int. Cl.⁴ .............................................. B23K 35/02
[52] U.S. Cl. .................................. 266/48; 219/69 R; 219/69 W; 219/69 C; 219/69 E; 427/59; 427/61
[58] Field of Search ............ 266/48; 219/69 R, 69 W, 219/69 C, 69 E, 70, 72; 427/59, 61

[56] References Cited

U.S. PATENT DOCUMENTS

| 4,069,407 | 1/1978 | Brower | 266/48 |
| 4,114,863 | 9/1978 | Campana | 266/48 |
| 4,391,209 | 7/1983 | Moore | 110/349 |
| 4,401,040 | 8/1983 | Dobi | 266/48 |
| 4,416,444 | 11/1983 | Brower | 266/48 |
| 4,437,649 | 3/1984 | Rieppel et al. | 266/48 |

FOREIGN PATENT DOCUMENTS 1469074 3/1977 Belgium .

Primary Examiner—Wayland Stallard
Attorney, Agent, or Firm—James C. Simmons; E. Eugene Innis

[57] ABSTRACT

An exothermic cutting electrode or burning bar provided with a coating containing oxidizing material, arc stabilizing material and a binder with portions of reduced coating thickness along the length of the electrode.

10 Claims, 5 Drawing Figures

COATED EXOTHERMIC CUTTING ELECTRODE

TECHNICAL FIELD

This invention pertains to exothermic cutting electrodes or burning bars of the type wherein a mass of metal is ignited in the presence of an oxidizing gas (e.g. oxygen) to form a flame or products of combustion which can be directed at a structural shape for cutting or piercing the structural shape.

BACKGROUND OF THE PRIOR ART

U.S. Pat. Nos. 4,391,209 and 4,437,649, the specifications of which are incorporated herein by reference, include a discussion of prior art electrodes to which the present invention pertains. The electrodes of the U.S. Pat. Nos. 4,391,209 and 4,437,649 contain a mass of metal in the form of an electrode which can be put into a torch and an arc struck between one end of the electrode and a workpiece. Simultaneously an oxidizing gas such as oxygen is conducted down through a center bore in the electrode so that the mass of metal is consumed to produce products of combustion or a flame which is the operative means for performing a cutting or piercing operation. The patented electrodes can be used not only to cut structural materials but to cut through ferrous and non-ferrous metals below water. Both of the aforementioned patents include a listing of prior art devices which are used above water and which may take the form of a tube into which there are a plurality of elongated rods, one of which is usually of a readily oxidizable metal such as aluminum or magnesium, and which can be used with an oxygen gas to perform the cutting operation.

British Pat. No. 1,469,074 illustrates an attempt to make a coated electrode by binding together several solid core coated electrodes around a central fluid passage formed by the coating. This type of electrode does not permit the user to stop the electrical current once the arc is initiated.

BRIEF SUMMARY OF THE INVENTION

The present invention pertains to an exothermic cutting electrode or burning bar for use primarily above water and particularly for land applications such as cutting through structural shapes, rock, concrete, and the like. The exothermic electrode is provided with a coating comprising an oxidizing material, an arc stabilizing material and a binder. The coating is further characterized in that portions of the coating longitudinally of the electrode are thinner than other portions of the coating which is continuous around the circumference of the electrode in order to facilitate oxidation of the electrode. Electrodes according to the present invention can be ignited by using a power supply to strike an arc between the electrode and the workpiece or a striker in the presence of oxidizing gas. After the reaction is started the power can be turned off and the reaction sustained. With coatings according to the present invention minimizing problems of stub out common with prior art devices and increased cutting rate are achieved. Furthermore, safety aspects of the electrode are improved since the coating tends to insulate the surface of the electrode compared to an uninsulated electrode.

DETAILED DESCRIPTION OF THE INVENTION

An exothermic electrode or burning bar according to the present invention provides a mass of oxidizable metal that in the presence of an oxidizing gas (e.g. oxygen) and a source of ignition will produce a flame which can be directed against a workpiece which may be part of a fixed land structure or submerged below the surface of a body of water so that in the hands of a skilled operator a cutting, piercing or burning operation can take place. Electrodes according to the present invention can be used to burn, cut, or pierce structural materials such as cast iron, steel, concrete and rock, the latter being either natural or synthetic.

With prior art exothermic electrodes or burning bars used above water, the cutting rates (amount of cut per given amount of electrode consumed) has not been high. Furthermore, with prior art devices there is a tendency for the electrode to "stub out" when the electrode contacts the workpiece whereby the arc is extinguished and the electrode fuses to the workpiece. Lastly, uncoated exothermic electrodes or burning bars can cause operator shock if inadvertently touched when the electrode is connected to a conventional welding power supply.

In the present invention it has been discovered that conventional exothermic electrodes or burning bars can be improved significantly by coating the electrode with a material that consists of an oxidizing material, arc stabilizing material, and a suitable binder which holds the coating together and bonds it to the electrode surfaces. Examples of material used for these individual functions are iron powder for the oxidizing material, compounds containing rare earth elements for the arc stabilizing material and sodium silicate as the binder. Coatings can commonly be applied by extrusion but may be applied by other means which would produce a relatively uniform coating. When electrodes according to the prior art were coated with such materials such as a flux material called Polychamfer 100, sold by the Weld Mold Company of Brighton, Mich., it was found that the flux acted as an insulator at the tip of the electrode causing the electrode to extinguish when the power is turned off. It has been discovered that in certain applications after the arc has been struck between the exothermic electrode or burning bar and the workpiece and oxidizing gas is introduced into the arc and the flame is produced, the electrical current can be turned off and the reaction continued.

Figure 1:
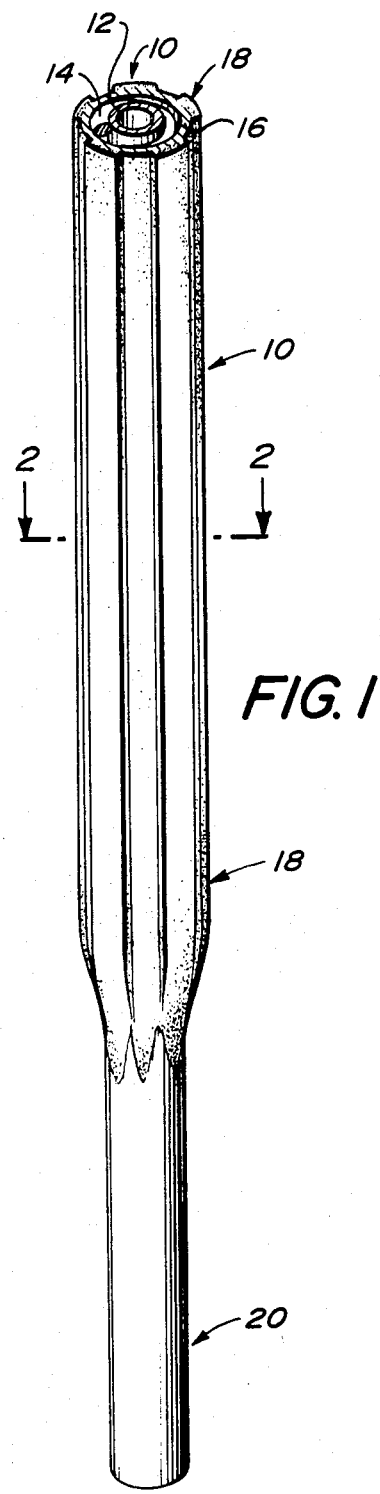
FIG. 1 is a perspective view of an electrode according to the present invention.
Figure 2:
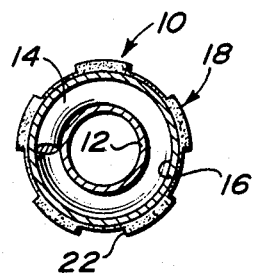
FIG. 2 is a cross-sectional view taken on the line 2—2 of FIG. 1.

In order to avoid the problem of extinguishment of the flame when the electrical current is turned off or the electrical arc is extinguished, it has been discovered that portions of the flux coating must be thinner as is shown in the drawing in FIGS. 1 and 2. Referring to FIGS. 1 and 2, the electrode 10 includes an inner tube 12 surrounded by a mass of metal 14 which can be in the form of a plurality of wires or a spring helically wound around inner tube 12 as shown in '209 and '649 patents. Disposed around the mass of metal 14 is an outer tube 16 which may be of the same metal used for the inner tube 12 and the mass of metal 14. A flux coating 18 is applied over substantial length of the electrode 10 except for an end portion 20 so that the electrode portion 20 can be inserted into a torch capable of conducting electrical current to the electrode from a conventional welding power supply or a fixed power supply such as a storage battery. The flux coating 18 is made to contain a plurality of flutes 22 which are regular in shape and disposed throughout the length of the flux coating 18. The flutes 22 can have the form of a polygon of regular cross-section or can simply be grooves (e.g. V-shaped cross-section) made along the entire length of the flux coating to present portions of flux coating that are thiner than the surrounding portions of the coating 18. If the flutes or grooves are made with a V-shaped cross-section the base of the V can be on the electrode substrate 16.

Figure 3:
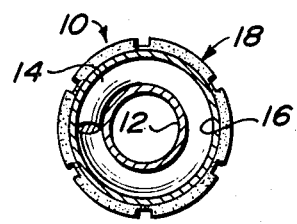
FIG. 3 is a cross-sectional view of an alternate embodiment of an electrode according to the present invention.

FIG. 3 shows an electrode wherein the flutes take the form of grooves having a cross-section in the shape of a regular polygon.

Figure 4:
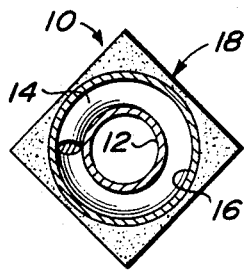
FIG. 4 is another embodiment of an electrode according to the present invention.
Figure 5:
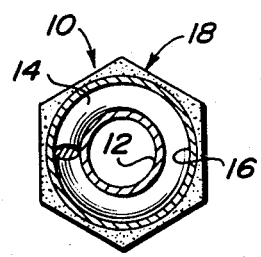
FIG. 5 is a further embodiment of an electrode according to the present invention.

FIGS. 4 and 5 show coatings wherein the reduced portions are effected by providing a coating which itself has a cross-sectional shape of a regular polygon so that there are thinner portions adjacent the surface of the underlying cylindrical electrode. The regular polygon can be a square, a rectangle, hexagon, pentagon, or the like, so long as a portion of the flux coating is thinner than an adjacent portion along the entire length of the electrode.

Table 1 sets forth a series of tests wherein uncoated electrodes were run with coated electrodes according to the present invention to cut a 1" piece of mild steel. The amperage applied to each electrode was the same as was the flow rate of oxygen.

Thus, electrodes according to the present invention give the user enormous benefit because of improved productivity resulting from fewer electrode changes to complete the cutting job at hand. Such time saving is important in underwater applications where the diver/welder is paid a premium wage. In above water applications the coating tends to insulate the surface of the electrode as opposed to bare electrodes.

The most surprising result of the improved coatings was the discovery that with electrodes according to the present invention once the arc has been used to start combustion the electrical current can be turned off without extinguishing the flame so that cutting can continue thus eliminating the possibility of electrical shock by inadvertent contact with the electrode. This also was observed with electrodes used to cut below the surface or a body of water.

The improved cutting rate obtained with electrodes according to the present invention in part results from the addition of oxidizable material to the arc or flame during the cutting operation. Thus, additional fuel for the oxygen-enriched atmosphere at the cutting end of the electrode is present to extend the length of usefulness of the electrode without physically building a longer electrode. The arc stabilizers present in the coating minimize the "stub out" occurrence of uncoated electrodes because these materials generally have low ionization potentials. This allows a arc to be maintained at very low voltage levels and prevent the electrode from sticking to the workpiece.

Having thus described our invention was desired to be secured by Letters Patent of the United States as set forth in the following claims.

We claim:

1. In an exothermic cutting electrode of the type having a mass of metal such as a plurality of elongated rods or wires, helically wound wire or solid mass of metal with a central aperture adapted to function as as electrode the improvement comprising in combination:

TABLE I

| Elect. # | AMP | Inches of Electrode Used | Total Arc Time Min. | Length of Cut (inch) | O₂ Flow | Cut Per Inch of Electrode | Cut Per Min. Arc Time | Type & Thickness of Material |
|---|---|---|---|---|---|---|---|---|
| A. Coated Electrode | | | | | | | | |
| 1 | 300 | 13.25 | 0.696 | 20.0 | 100 psi | 1.509 | 28.74 | 1" mild steel |
| 2 | 300 | 13.25 | 0.810 | 24.0 | 100 psi | 1.811 | 29.63 | 1" mild steel |
| 3 | 300 | 14.25 | 0.788 | 23.25 | 100 psi | 1.632 | 29.51 | 1" mild steel |
| 4 | 300 | 15.25 | 0.710 | 23.125 | 100 psi | 1.516 | 32.57 | 1" mild steel |
| 5 | 300 | 14.25 | 0.794 | 24.125 | 100 psi | 1.693 | 30.38 | 1" mild steel |
| 6 | 300 | 15.00 | 0.782 | 24.375 | 100 psi | 1.625 | 31.17 | 1" mild steel |
| 7 | 300 | 15.50 | 0.781 | 24.375 | 100 psi | 1.573 | 31.21 | 1" mild steel |
| 8 | 300 | 14.75 | 0.779 | 24.25 | 100 psi | 1.644 | 31.33 | 1" mild steel |
| AVERAGE | | 14.4375 | 0.767 | 23.437 | | 1.625 | 30.54 | |
| B. Uncoated Electrode | | | | | | | | |
| 1 | 300 | 14.875 | 0.607 | 11.5 | 100 psi | 0.773 | 18.946 | 1" mild steel |
| 2 | 300 | 14.563 | 0.603 | 14.5 | 100 psi | 0.996 | 24.046 | 1" mild steel |
| 3 | 300 | 14.938 | 0.583 | 15.0 | 100 psi | 1.004 | 25.729 | 1" mild steel |
| 4 | 300 | 15.500 | 0.547 | 15.5 | 100 psi | 1.000 | 28.336 | 1" mild steel |
| 5 | 300 | 14.375 | 0.583 | 25.0 | 100 psi | 1.043 | 25.729 | 1" mild steel |
| 6 | 300 | 14.750 | 0.580 | 14.125 | 100 psi | 0.958 | 24.353 | 1" mild steel |
| 7 | 300 | 14.250 | 0.533 | 13.875 | 100 psi | 0.974 | 26.032 | 1" mild steel |
| 8 | 300 | 14.500 | 0.567 | 15.5 | 100 psi | 1.069 | 27.336 | 1" mild steel |
| 9 | 300 | 12.625 | 0.517 | 13.5 | 100 psi | 1.069 | 26.112 | 1" mild steel |
| 10 | 300 | 12.250 | 0.510 | 12.25 | 100 psi | 1.000 | 24.020 | 1" mild steel |
| AVERAGE | | 14.263 | 0.563 | 14.075 | | 0.989 | 25.064 | |

In the foregoing Table 1 it is apparent that when the columns cut per inch of electrode for the uncoated and coated are compared and, in particular the average of the two, there is approximately 64% improvement in the utilization of electrode material to effect a given cut.

said electrode coated with a mixture containing an oxidizing material, arc stabilizing material and a binder wherein said coating is provided with a plurality of generally parallel longitudinal portions of reduced thickness said portions extending substantially the length of the coating.

2. An electrode according to claim 1 wherein the portions of reduced thickness are grooves in the coating.

3. An electrode according to claim 1 wherein ths portions of reduced thickness in the coating are flutes having the cross-sectional shape of a generally regular polygon.

4. An electrode according to claim 1 wherein the coating is placed on the electrode in the shape of a regular polygon.

5. An electrode according to claim 1 wherein the coating is a conventional welding flux.

6. A method of improving an exothermic electrode or burning bar comprising the steps of:

coating the electrode with a mixture containing an oxidizing material, arc stabilizing material and a binder, and providing said coating with a plurality of generally parallel longitudinal portions of reduced thickness said portions extending substantially the length of the coating.

7. A method according to claim 1 wherein the portions of reduced thickness are grooves in the coating.

8. A method according to claim 1 wherein the portions of reduced thickness in the coating are flutes having the cross-sectional slope of a generally regular polygon.

9. A method according to claim 1 wherein the coating is placed on the electrode in the shape of a regular polygon.

10. A method according to claim 1 wherein the coating is a conventional welding flux.

* * * * *